UNITED STATES PATENT OFFICE.

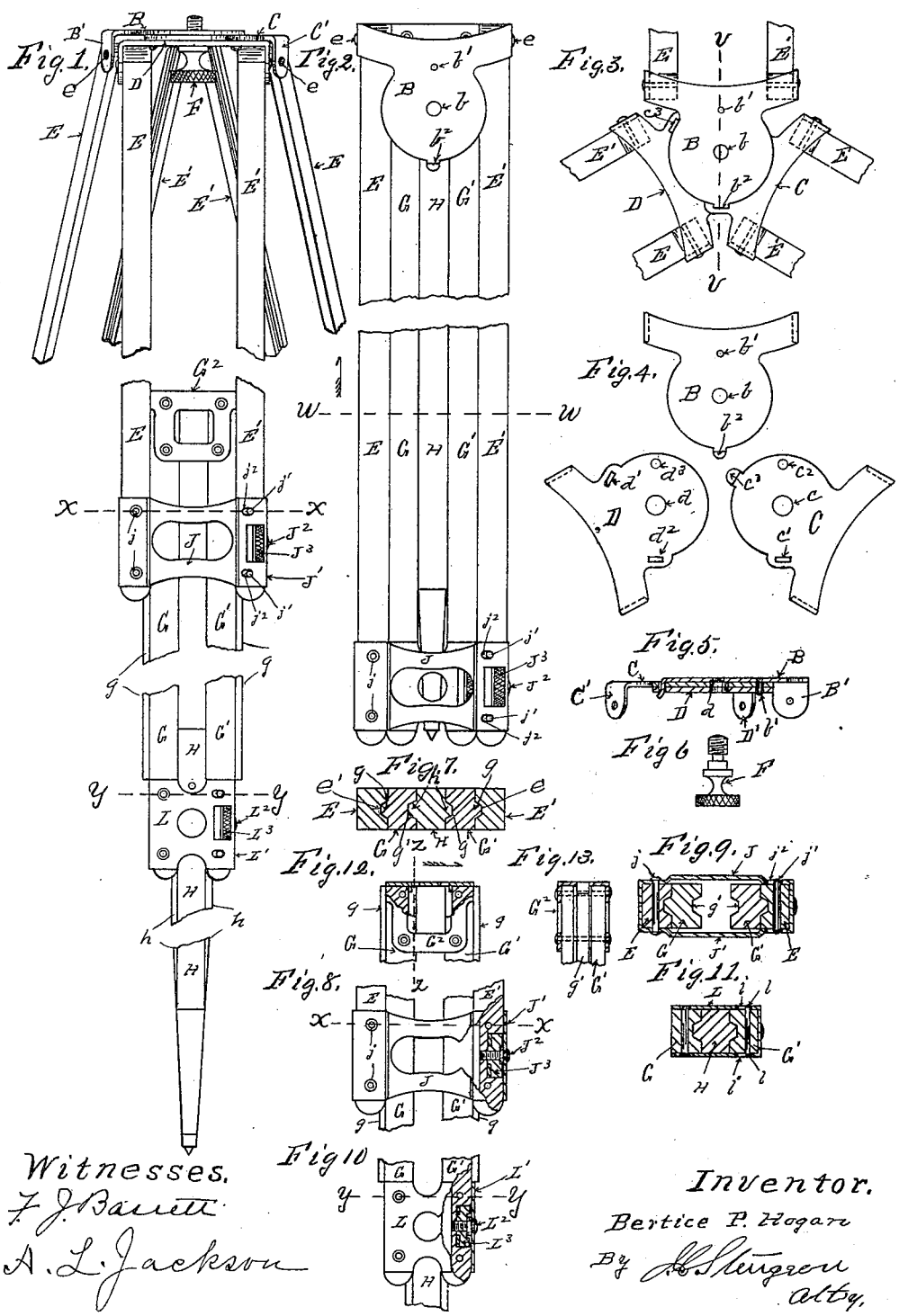

BERTICE P. HOGAN, OF ERIE, PENNSYLVANIA.

TRIPOD-STAND.

SPECIFICATION forming part of Letters Patent No. 667,624, dated February 5, 1901.

Application filed July 21, 1900. Serial No. 24,349. (No model.)

*To all whom it may concern:*

Be it known that I, BERTICE P. HOGAN, a citizen of the United States, residing at Erie, in the county of Erie and State of Pennsylvania, have invented certain new and useful Improvements in Tripod-Stands; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

This invention relates to improvements in tripod-stands for cameras, &c.; and it consists, substantially, in making the tripod-head in sections adapted to engage or interlock with each other and so securing these sections to the tripod-legs that they can be folded down thereon, and in the improved construction of the tripod-legs and the clamping mechanism therefor, hereinafter described, the object of my invention being to so construct the head and legs of a collapsible tripod that it will furnish an effective support for cameras, &c., and also enable the tripod head and legs to be so nested together as to form a compact bundle for transportation. These features are more fully hereinafter described and are illustrated in the accompanying drawings, in which—

Figure 1 is a view in elevation of my improved tripod with portions of two of the legs broken away. Fig. 2 is a view in elevation of one of the tripod-legs telescoped together and with the head-section thereon folded down against the side thereof. Fig. 3 is a top or plan view of the tripod-head with sections of the legs thereon. Fig. 4 is a plan view of the three sections of the tripod-head detached from each other. Fig. 5 is a vertical section of the tripod-head on the line $v$ $v$ in Fig. 3. Fig. 6 is a view in elevation of the screw for securing a camera to the tripod-head. Fig. 7 is a transverse section of the leg in the position shown in Fig. 2 on the line $w$ $w$ in said figure. Fig. 8 is a view of the upper-leg-section-clamping mechanism partially in elevation and partially in section. Fig. 9 is a transverse section of the same on the line $x$ $x$ in Figs. 1 and 8. Fig. 10 is a view of the lower-leg-clamping mechanism partially in elevation and partially in section. Fig. 11 is a transverse section of the same on the line $y$ $y$ in Figs. 1 and 10. Fig. 12 is a view of the brace between the upper ends of the middle sections of the legs partially in elevation and partially in section. Fig. 13 is a vertical section of the same on the line $z$ $z$ in Fig. 12.

In the drawings thus illustrating my invention, A is the tripod-head, which is composed of sections B, C, and D, each of which is provided with downwardly-projecting lugs $B'$, $C'$, and $D'$, to which the upper ends of the upper sections E E' of the legs are pivoted by means of pintles $e$. The head-sections C and D are provided with central openings $c$ and $d$, adapted to receive the shank of the screw F, Fig. 6, and the section B with a central opening $b$, which is screw-threaded to receive the screw F and through which the screw F passes to secure the camera or other device to be supported by the tripod. In the section D there are also two rectangular openings $d'$ $d^2$ and a pin-hole $d^3$. In the section C there is also a rectangular opening $c'$, a pin-hole $c^2$, and a downwardly-projecting lug $c^3$, adapted to enter the opening $d'$ in the section D, which then brings the openings $c'$ in C, $d^2$ in D, the pin-holes $c^2$ and $d^3$, and the central openings $c$ and $d$ coincident with each other. The section B has also a downwardly-projecting pin $b'$, adapted to enter the holes $c^2$ and $d^3$, and a downwardly-projecting lug $b^2$, adapted to pass through the openings $c'$ $d^2$ in C and D, so that the sections B, C, and D interlock with each other and are firmly held together by the screw F passing into the camera or other object to be supported upon the tripod, while it is obvious that on the removal of the screw F the sections B, C, and D of the head can be at once detached from each other and folded down against the sides of the legs, as illustrated in Fig. 2.

The tripod-legs are composed of three sections—an upper section, consisting of two strips E E', provided with grooves $e'$ on their inner edges, and a middle section, consisting of two strips G G', having tongues $g$ on their outer edges to fit the grooves $e'$ on the inner edges of the sections E E' and grooves $g'$ on their inner faces to fit tongues $h$ on the lower section H, which consists of a single strip, so that the leg-sections E E', G G', and H will slide longitudinally on each other, as is clearly shown in Figs. 2 and 7. The upper ends of the upper sections E and E' of the legs are pivoted to the ears B', C', and D' of the head-sections B, C, and D, and the lower ends of the sections E E' are secured together by means of a clamping device J, which embraces the lower ends thereof, so that the parts E E' are parallel to each other, and which is secured firmly to the part E by means of rivets $j$, while the part E' is secured thereto by means of rivets $j'$, passing through slotted holes $j^2$ in the clamp J, as illustrated in Figs. 1, 2, and 9, so as to allow the part E' to move laterally therein, and in the edge J' there is secured an inwardly-projecting screw $J^2$, provided with a milled nut $J^3$, operating in a slotted opening in the clamp J against the part E', so as to force it inwardly against the part G' of the sections G G', as shown in Figs. 1, 2, and 8. The parts G G' are secured together parallel to each other by the brace $G^2$ at the upper ends thereof and by a clamping device L at the lower end thereof, the brace $G^2$ being clearly shown in Figs. 1, 12, and 13. The clamping device L is constructed and operated in the same manner as the clamping device J hereinbefore described, the part G' being secured therein by pins $l$, operating in slotted holes $l'$ in the clamps L, as shown in Fig. 11, and in the side L' there is secured a screw $L^2$, having a milled nut $L^3$ thereon, operating in a slotted opening in the clamp L against the outside of the part G' to force it inwardly against the part H, so as to clamp the parts G, G', and H together, as shown in Figs. 1 and 10. It will be observed (see Fig. 9) that the transverse portion of the clamping device J is raised up slightly, so as to allow the clamping device L to pass under it, so that the parts G G' of the leg will telescope completely within the parts E E' thereof, while the part H will also telescope in like manner within the parts G G', as shown in Fig. 2.

Having thus described my invention so as to enable others to construct and use the same, I do not desire to limit myself to all of the details of the construction thereof shown and described, as I am aware that many features thereof may be modified without departing from the spirit of my invention.

Therefore, what I claim as new, and desire to secure by Letters Patent of the United States, is—

1. The combination of three independent tripod-head sections each provided with mechanism adapted to interlock with the others when superimposed upon each other, so as to form a complete tripod-head, substantially as set forth.

2. The combination of three independent sections each having slots therein and lugs on each section adapted to enter said slots when the sections are superimposed upon each other and form a tripod-head, substantially as set forth.

3. The combination in a tripod, of three independent head-sections, a leg pivoted to each of said head-sections, and mechanism on each of said head-sections adapted to interlock with the others when said head-sections are superimposed upon each other, substantially as and for the purpose set forth.

4. The combination in a tripod-leg of an upper section adapted to be pivoted at its upper end to a tripod-head section, a middle section sliding in grooves in the inner faces of the upper section, a clamp mechanism in the lower end of the upper section adapted to compress it upon the middle section, a lower section sliding longitudinally in grooves in the inner faces of the middle section and clamp mechanism in the lower end of the middle section adapted to clamp the lower ends of the middle section against the lower section, substantially as and for the purpose set forth.

In testimony whereof I affix my signature in presence of two witnesses.

BERTICE P. HOGAN.

Witnesses:
F. J. BASSETT,
H. J. CURTZE.